United States Patent
Armstrong et al.

(10) Patent No.: US 7,290,125 B2
(45) Date of Patent: Oct. 30, 2007

(54) METHOD FOR SCHEDULING LAUNCH A COMPUTER SYSTEM BASED UPON A TIME OF TIMED POWER-ON PARTITION OF LOGICAL PARTITIONS

(75) Inventors: Troy D. Armstrong, Rochester, MN (US); Adam C. Lange-Pearson, Rochester, MN (US)

(73) Assignee: International Business Corporation, Armonk, NY (US)

(*) Notice: Subject to any disclaimer, the term of this patent is extended or adjusted under 35 U.S.C. 154(b) by 1006 days.

(21) Appl. No.: 10/418,348

(22) Filed: Apr. 17, 2003

(65) Prior Publication Data

US 2004/0210705 A1 Oct. 21, 2004

(51) Int. Cl.
*G06F 15/177* (2006.01)

(52) U.S. Cl. .................. 713/1; 713/330; 711/100; 718/102

(58) Field of Classification Search .................. 713/1, 713/2, 324; 718/100, 102
See application file for complete search history.

(56) References Cited

U.S. PATENT DOCUMENTS

| | | | | |
|---|---|---|---|---|
| 5,426,775 A | * | 6/1995 | Boccon-Gibod | 714/36 |
| 5,802,354 A | * | 9/1998 | Kubala et al. | 713/400 |
| 6,421,777 B1 | * | 7/2002 | Pierre-Louis et al. | 713/2 |
| 6,421,786 B1 | * | 7/2002 | Yoshihara | 713/500 |
| 6,687,820 B2 | * | 2/2004 | French et al. | 713/2 |
| 6,691,146 B1 | * | 2/2004 | Armstrong et al. | 718/100 |
| 6,829,714 B2 | * | 12/2004 | Smith et al. | 713/330 |
| 7,065,761 B2 | * | 6/2006 | Foster et al. | 718/100 |
| 2002/0124165 A1 | * | 9/2002 | Smith et al. | 713/2 |
| 2005/0015581 A1 | * | 1/2005 | Chen | 713/2 |

\* cited by examiner

*Primary Examiner*—Chun Cao
(74) *Attorney, Agent, or Firm*—Patterson & Sheridan, LLP

(57) ABSTRACT

Methods, systems, and media for timed power-on in a logically partitioned environment are disclosed. Embodiments may disclose determining a time period based upon a time to launch a partition and a time of day associated with the next partition to launch. After determining the time period, a timer is set to boot the system based upon the time period. More specifically, embodiments allow the timed power-on (TPO) and time of day (TOD) of logical partitions to be modified by clients independently of other partitions by determining the system TPO based upon TPOs and TODs of logical partitions as well as the TOD of the system. Some embodiments include initiating a transaction like an interrupt in response to a change in a TPO or TOD of logical partition or the system. Several of such embodiments incorporate adjusting or re-calculating the system TPO in response to the transaction.

24 Claims, 3 Drawing Sheets

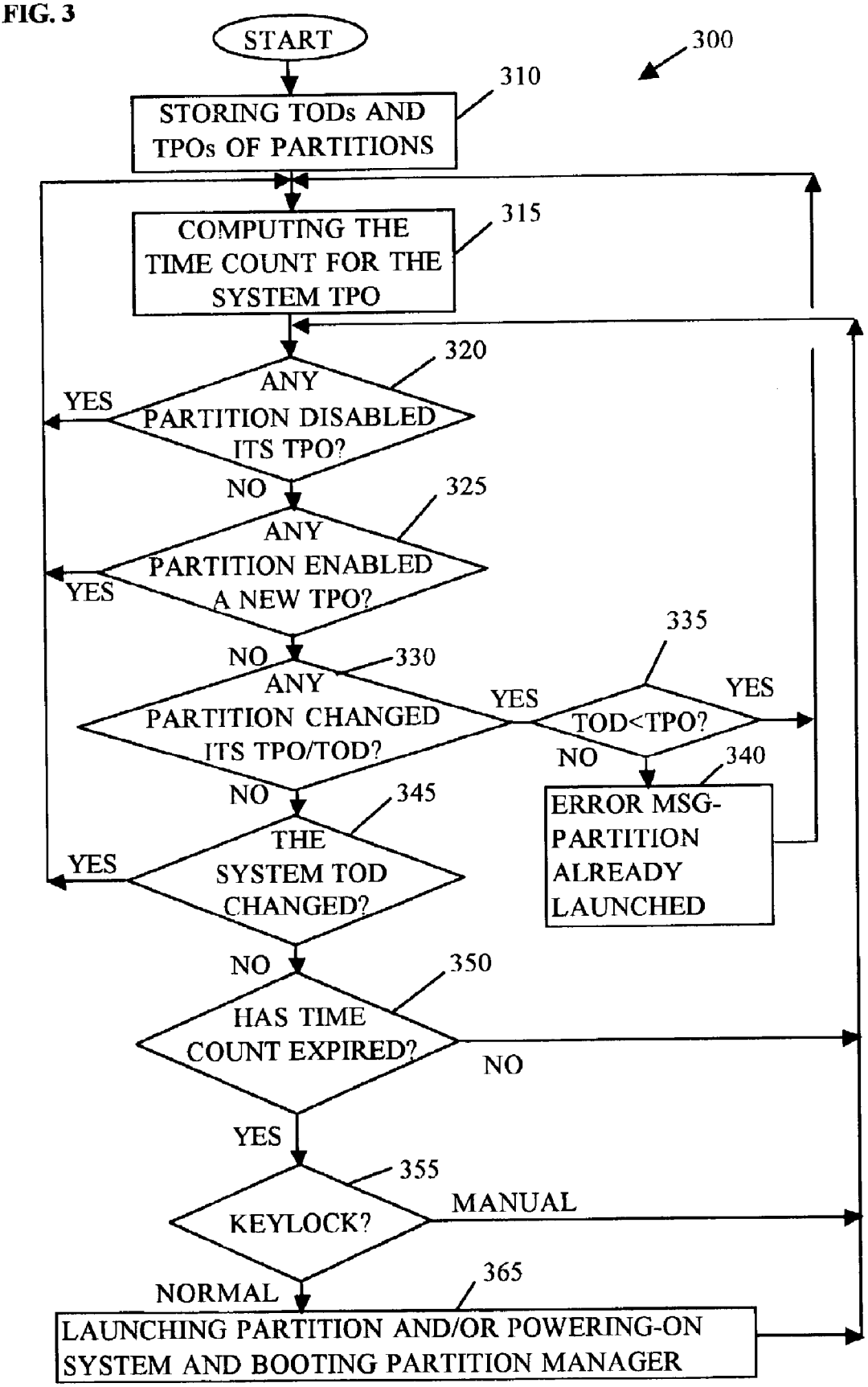

METHOD FOR SCHEDULING LAUNCH A COMPUTER SYSTEM BASED UPON A TIME OF TIMED POWER-ON PARTITION OF LOGICAL PARTITIONS

BACKGROUND OF THE INVENTION

1. Field of the Invention

The present invention generally relates to the field of logically partitioned computer systems. More particularly, the present invention relates to methods, systems, and media for timed launching of logical partitions of computer systems.

2. Description of the Related Art

Parallel processing generally refers to performing multiple computing tasks in parallel. Traditionally, parallel processing requires multiple computer systems with the resources of each computer system dedicated to a specific task or allocated to perform a portion of a common task. However, recent advances in computer hardware and software technologies have resulted in single computer systems capable of highly complex parallel processing by logically partitioning the system resources to different tasks. In a logically partitioned computer system, available system resources are allocated among multiple, logical partitions, each designed to appear to operate independently of the other. Management of the resources among logical partitions is typically accomplished via a layer of software components commonly referred to as a partition manager.

An objective of the partition manager is to allow each logical partition to independently run software (e.g. operating systems and operating system specific applications) typically developed to run on a dedicated computer system, with little or no modification. For example, one logical partition may be running a first operating system such as IBMs OS/400, a second partition may be running and operating system such as IBMs AIX, while a third partition may be running a third operating system such as LINUX. By providing the ability to run multiple operating systems on the same computer system, a logically partitioned computer system may provide a user with a greater deal of freedom choosing application software best suited to the users need with little or no regard to the operating system for which the application program was written.

Logically partitioned systems, like other large computer systems, utilize a Timed Power On (TPO) function to power on the system at a specified time. An advantage of this approach, for example, is saving energy during prolonged periods of inactivity. Prolonged periods of inactivity may occur over weekends and holidays so the computer system may be powered down during the weekends and holidays and then powered on for the next workday, prior to the arrival of employees.

Unlike other large computer systems, logically partitioned systems introduce complexities with regard to TPOs. In particular, a primary partition of a logically partitioned system is in charge of periodically checking memory locations associated with the TPOs for each logical partition to determine whether one or more of the logical partitions should be launched. Accordingly, the system administrator must launch the primary partition before the secondary, logical partitions can be launched.

Current logically partitioned systems also offer a large, variable number of logical partitions, each logical partition servicing a different client with distinct periods of inactivity and working hours. Thus, the TPOs for all logical partitions of a computer system must either be manually coordinated with the launch of the primary partition by the system administrator, or logical partitions that are scheduled to launch prior to the launch of the primary partition will be delayed until the primary partition launches. Additionally, when servicing potentially hundreds of clients, manual coordination of the primary partition's TPO is cumbersome and prone to errors and the use of wide area networks (WANs) like the Internet further exacerbates these problems since the logical partitions can be used by clients of different entities located in different time zones.

Therefore, there is a need for timed power-on in a logically partitioned environment.

SUMMARY OF THE INVENTION

The problems identified above are in large part addressed by methods, systems, and media for timed power-on in a logically partitioned environment. One embodiment provides a method for launching at least one logical partition of a system. The method generally includes determining a time period based upon a time to launch a partition of the at least one logical partition and a time of day associated with the partition, the partition being the next partition to launch of the at least one logical partition; scheduling a launch for the system based upon the time period; and launching the system in response to the scheduled launch for the system.

Another embodiment provides an apparatus for launching at least one logical partition of a system. The apparatus may include system hardware to partition; partition management circuitry to receive an event to indicate modification of a time to launch a logical partition of the at least one logical partition and determine a time period for the next scheduled launch associated with the at least one logical partition; and a timer coupled with the system hardware to boot the partition management circuitry based upon the time period.

A further embodiment provides a computer readable medium containing a program which, when executed, performs an operation. The operation may include determining a time period based upon a time to launch a partition of at least one logical partition and a time of day associated with the partition, the partition being the next partition to launch of the at least one logical partition; scheduling a launch for the system based upon the time period; and launching the system in response to the scheduled launch for the system.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 3 depicts an embodiment of a method for timed power-on in a logically partitioned environment.

DETAILED DESCRIPTION OF THE PREFERRED EMBODIMENTS

The following is a detailed description of example embodiments of the invention depicted in the accompanying drawings. The example embodiments are in such detail as to clearly communicate the invention. However, the amount of detail offered is not intended to limit the anticipated variations of embodiments, but on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, the invention contemplates methods, systems, and media for timed power-on in a logically partitioned environment. Embodiments may disclose determining a time period based upon a time to launch a partition and a time of day associated with the next partition to launch. After determining the time period, a timer is set to boot the system based upon the time period. More specifically, embodiments allow the timed power-on (TPO) and time of day (TOD) of logical partitions to be modified by clients independently of other partitions by determining the system TPO based upon TPOs and TODs of logical partitions as well as the TOD of the system. Some embodiments include initiating a transaction like an interrupt in response to a change in a TPO or TOD of logical partition or the system. Several of such embodiments incorporate adjusting or re-calculating the system TPO in response to the transaction.

Figure 1:
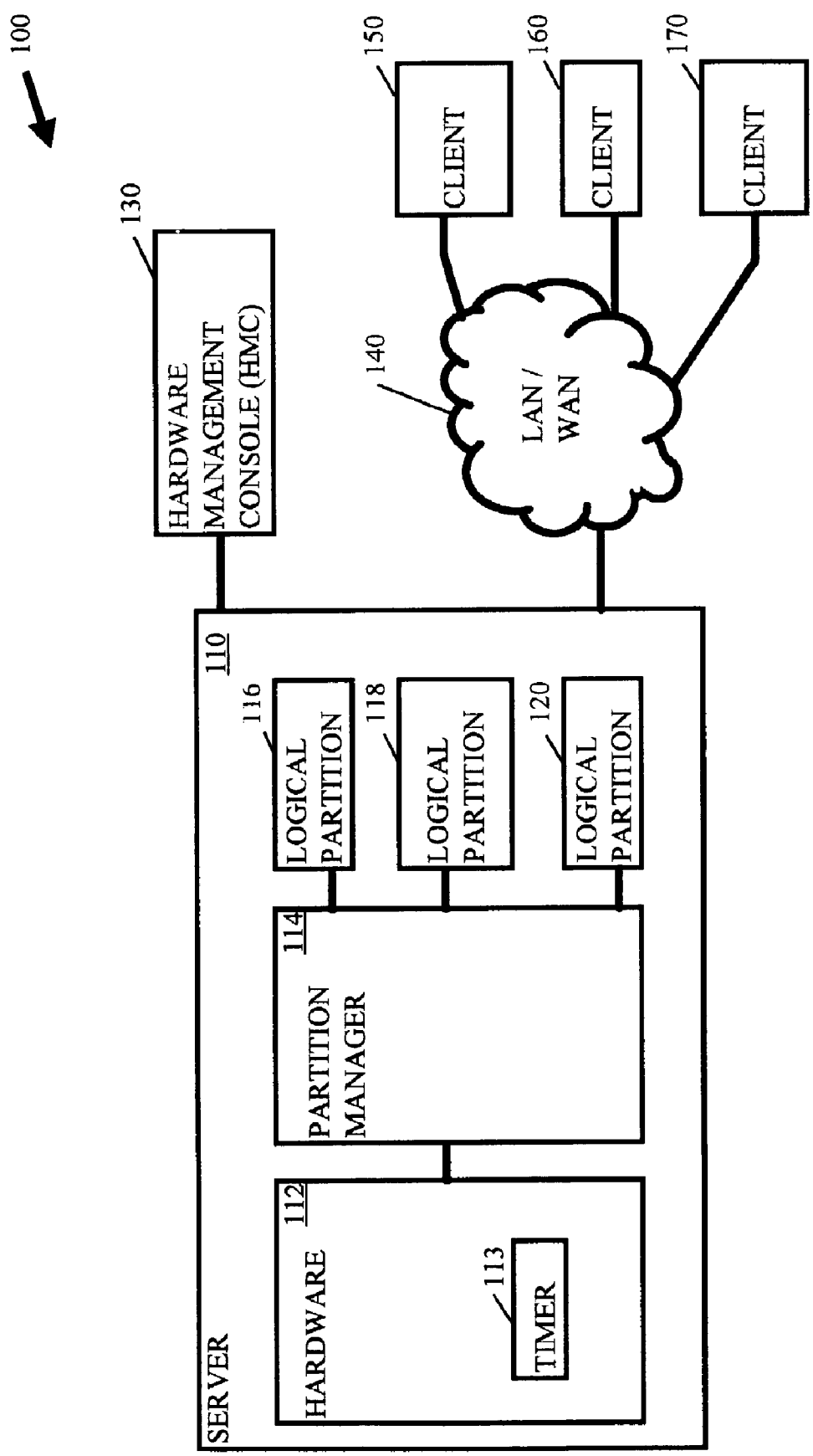
FIG. 1 is an embodiment of a computer system with one or more than one logical partition as part of the local network or wide area network.

Turning now to the drawings, FIG. 1 depicts an embodiment of a system 100 for timed power-on in a logically partitioned environment. System 100 comprises a server 110, a hardware management console (HMC) 130, a local area network/wide area network (LAN/WAN) 140, and clients 150, 160, and 170. Server 110 is a computer system having processing and storage capacity to service clients 150, 160, and 170. For example, server 110 may include server software for multiple departments of an organization like a database system, allowing members of each department to access the database software via logical partitions 116, 118, and 120, while maintaining public and private databases for each department. Each department is assigned to a different logical partition and each logical partition is provided with processing capacity, memory, and data storage capacity to use the software on the server based upon demonstrated or known needs of the corresponding departments.

Server 110 includes hardware 112, a partition manager 114, and logical partitions 116, 118, and 120. Hardware 112 is a computer system having one or more processors coupled with memory to partition between one or more logical partitions. For instance, server 110 may be a symmetric multiprocessor (SMP) system including a plurality of processors such as an IBM RS/6000 or a multi-platform operating environment such as an IBM eServer iSeries that supports software like OS/400, Linux, WebSphere, Microsoft Windows and other e-business application environments on a single server for simplified management. Many such embodiments also support dynamic logical partitioning for allocation of resources and easy administration.

Hardware 112 includes a timer 113 like a counter or a service processor that remains active while partition manager 114 and logical partitions 116, 118, and 120 are shut down. Timer 113 can automatically boot the system, i.e. partition manager 114, when the time of day (TOD) associated with server 110 reaches the timed power-on (TPO) set for partition manager 114. However, in many embodiments, the automatic boot can be disabled or overridden.

Partition manager 114 maintains logical partitions 116, 118, and 120 and provides a system operator with the ability to create, manage, and remove logical partitions. When the logical partitions are shut down for the evening or for the weekend, partition manager 114 typically shuts down and timer 113 of hardware 112 boots partition manager 114 at the TPO set by partition manager 114 prior to shutting down.

With regards to management of the logical partitions, partition manager 114 may receive an event to indicate modification of a time to launch a logical partition of logical partitions 116, 118, and 120 and determine a time period to the next scheduled launch associated with logical partitions 116, 118, and 120. For example, partition manager 114 receives a new TPO for logical partition 116 indicating that the client associated with logical partition 116 wants logical partition 116 to launch at 7:00 a.m. central standard time (CST) so that the services offered by logical partition 116 are available for the employees that arrive at work at 8:00 a.m. CST. Partition manager 114 stores the modified partition TPO, recalculates the system TPO, stores the new TPO for the system and sets timer 113 to expire based upon the new TPO.

In some embodiments, setting the timer to expire may include storing a time in a memory location that is compared with the current TOD to determine when the timer expires. In other embodiments, setting the timer to expire may include storing a time count in a counter or in a memory location used as a counter. The time count is the difference between the new TPO and the current TOD for the corresponding partition. Accordingly, the timer expires upon reaching the time count.

Logical partitions 116, 118, and 120 represent physical and/or logical divisions of resources available from server 110 for clients 150, 160, and 170 via partition manager 114. The division allows the logical partitions to operate as independent logical systems, each having processing capacity, memory, storage capacity, and I/O devices. For instance, partition manager 114 may divide hardware 112 between the three logical partitions 116, 118, and 120. Partition manager 114 may also borrow processing capacity from the logical partitions and have access to a specified range of physical memory addresses to manage the logical partitions. Logical partitions 116, 118, and 120 may each have access to, e.g., 33% of the processing capacity of the remaining processors, memory and data storage capacity. In particular, partition manager 114 may enforce selections by the system operator(s) who logically partitioned the system, restricting the access of logical partition 116 to one third of the processing capacity of one or more of the physical processors, a range of logical memory addresses, dynamically assigned to physical memory address via a look up table, and one third of the remaining data storage capacity by physically dividing address ranges or providing a range of logical addresses. Some embodiments are capable of supporting 254 or more logical partitions.

Logical partitions 116, 118, and 120 may also maintain independent operating systems, each having independent TODs and TPOs distinct from the system TOD and the system TPO. The system TOD is typically the TOD associated with server 110 and the system TPO is typically the TPO associated with booting partition manager 114. Since partition manager 114 divides the system resources and maintains the logical partitions, the system TPO is determined based upon the earliest launch of the logical partitions scheduled to be launched. In particular, the determination of the system TPO takes into account the TPOs of each logical partition and is used to facilitate booting partition manager 114, and, in some embodiments, powering on hardware 112 of server 110 in time to launch the next logical partition scheduled to be launched. The determination may also take into account the TODs of each logical partition so that clients 150, 160, and 170 coupled with the logical partitions 116, 118, and 120, respectively, may reside in different time zones and change the logical partition TODs to match their own time zones.

HMC 130 is optional hardware that may provide access for a system operator for the server like a system administrator to create, manage, and remove logical partitions of server 110 such as logical partitions 116, 118, and 120. In some embodiments, HMC 130 provides access to server 110 to adjust the system TOD and/or the system TPO. In many such embodiments, HMC 130 provides access to hardware 112 when partition manager 114 is not running.

In one embodiment, HMC 130 is coupled directly with server 110 via a dedicated Ethernet connection. In other embodiments, HMC 130 may couple with server 110 via a network like local area network/wide area network (LAN/WAN) 140.

LAN/WAN 140 is a network connection to couple server 110 with clients such as clients 150, 160, and 170. In some embodiments, LAN/WAN 140 may include a network in an office coupled with a cable modem, a direct subscriber line (DSL), a T1 line, a T3 line, or the like. In further embodiments, LAN/WAN 140 may include a network of temporary connections such as connections via a telephone system. In other embodiments, one or more clients like clients 150, 160, and 170 may couple with server 110 directly. For example, server 110 operates as a web server allowing multiple businesses to connect to the web site independently via logical partitions for facilitating business-to-business (B2B) transactions. The client businesses can access their logical partition from anywhere in the world via the Internet and set the TPO for their logical partition based upon the next time they expect to access server 110. Partition manager 114 recognizes changes in the TPO for the each client and determines when the system should boot based upon those changes.

Clients 150, 160, and 170 include computer systems like personal computers, laptops, other servers, or the like, having hardware and software to communicate with server 110 via LAN/WAN 140.

Figure 2:
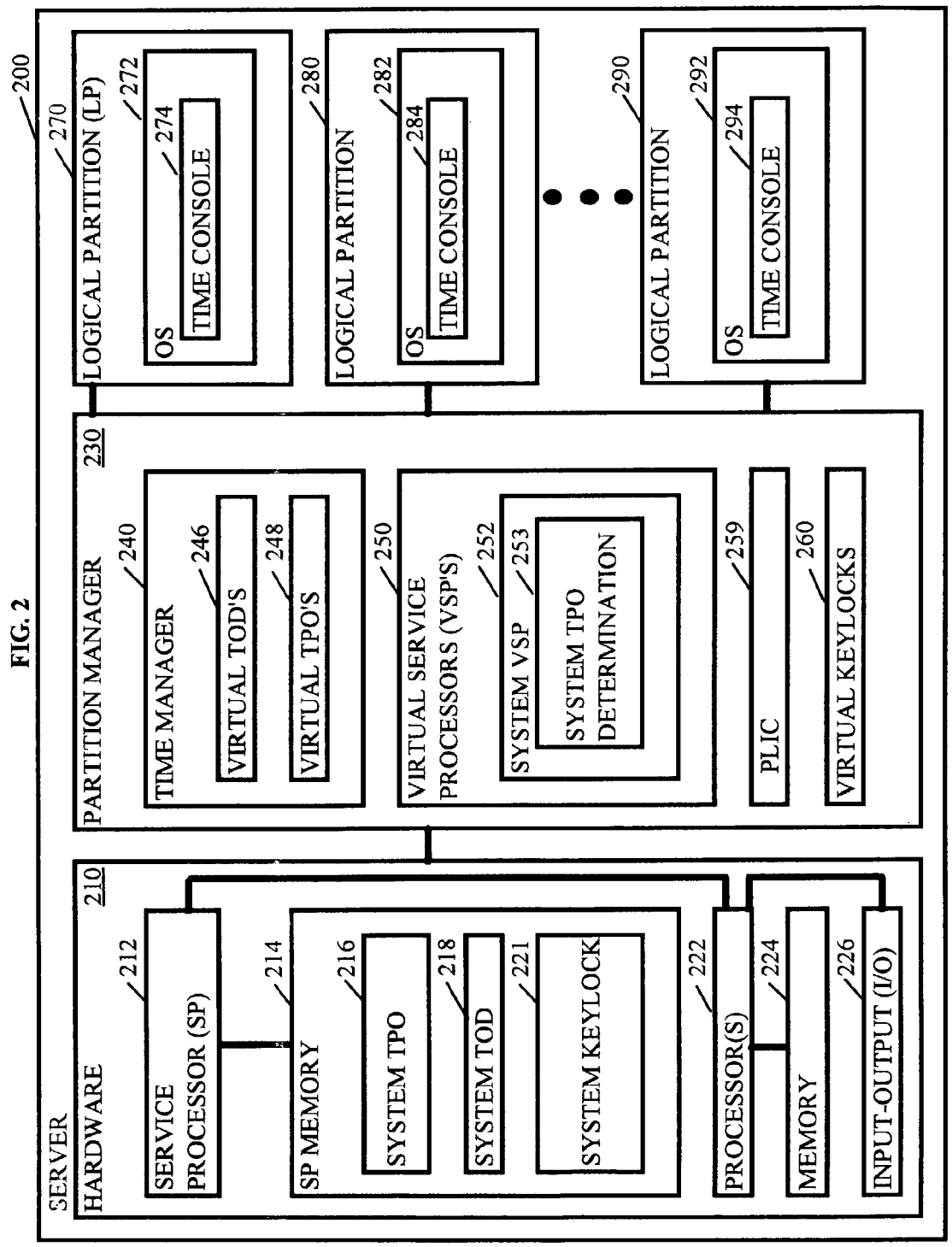
FIG. 2 is an embodiment of an apparatus including a server having hardware and firmware for implementing timed power-on in a logically partitioned environment.

Referring now to FIG. 2, there is shown an embodiment of a server 200 timed launching of logical partitions of the computer system. Server 200 includes hardware 210, a partition manager 220, and logical partitions 270 through 290. Hardware 210 provides a computer system having one or more processors and memory that can be allocated to multiple logical computer systems to offer the advantage of multiple servers in terms of processing capabilities with the advantages of a single server in terms of maintenance and software management. For instance, hardware 210 can operate as one or more servers in one or more time zones, each having the capability of launching independently and each having the capability of running a different, independent operating system.

Hardware 210 includes service processor (SP) 212, SP memory 214, processor(s) 222, memory 224, and input-output (I/O) 226. SP 212 acts as a timer that is coupled with the remainder of hardware 210 to boot the partition manager 230 based upon the TPO for server 200. More specifically, SP 212 is a processor generally configured to power on and boot processor(s) 222, memory 224, and I/O 226 along with partition manager 230 when the time of day associated with the system reaches the system TPO set to boot partition manager 230. SP 212 also couples with processor(s) 222 via a processor bus and couples with dedicated memory SP memory 214.

When server 200 is initially powered up, SP 212 uses the processor bus to interrogate the system (Host) processor(s) 222, memory 224, and I/O 226 to obtain an inventory and topology understanding of server 200. SP 212 then proceeds to load executable code and release processor(s) 222 for execution of the code.

SP 212 maintains system TPO 216 and system TOD 218 to keep track of scheduled launches for partition manager 230. SP 212 also maintains a system keylock 221 as an override to enable or disable automatic booting for the system. For example, customers coupled with logical partitions 270 through 290 may set system TPO 216 to automatically "power on" or launch their partition early Monday morning, just in time for employees to start using the server 110. Thus, the system TPO 216 is set for some time before the first logical partition is set to wake up. On the other hand, if server 230 or software thereon is being maintenanced or modified, system keylock 221 may be switched from "normal" to "manual" to prevent partition manager 230 from automatically booting in response to the expiration of system TPO 216. In many such embodiments, system TPO 216 is set with a time count or time period that is the amount of time remaining until a user set time to power on the system or a TPO associated with a logical partition expires.

Processor(s) 222 include one or more system or host processors that provide the processing capacity for server 200. Processor(s) 222 can be divided in accordance with logical processor units assigned to logical partitions by a system operator. For example, the system operator may provide a fraction of a processor to a logical partition.

Memory 224 may include one or more memory devices having blocks of memory associated with physical addresses. As with processor(s) 222, memory 224 can be divided into physical blocks and associated with a logical partition or amounts of memory can assigned to logical partitions via logical blocks of addresses. The logical addresses can be assigned to physical addresses as data is stored at the logical addresses.

I/O 224 includes I/O controllers, I/O busses and I/O adapters such as peripheral component interconnect (PCI) cards to couple server 210 with I/O equipment like tape drives, disk drives, compact disk (CD) drives, hard drives, optical drives, printers, scanners, telephone systems, and networks. I/O equipment may also be physically and/or logically associated with logical partitions.

Partition manager 230 comprises low-level encoded data, often referred to as partitioning licensed internal code (PLIC), to enforce logical partitioning of hardware 210 for logical partitions 270 through 290. Partition manager 230 enforces logical partitioning of hardware 210 by presenting a partitioned view of hardware to task dispatchers of higher levels of code, such as code executed within the partitions. For instance, a client changes a time to launch a logical partition, initiating code to cause a perceived processor change a value at a memory location. Partition manager 230, however, receives the value, interprets the instruction to store the value as an event indicating modification of the time to launch, associates the memory location with a physical memory location, stores the modified time to launch in the physical memory location, utilizes code execution cycles of processor(s) 222 to determine a time period to the next scheduled launch associated with logical partitions 270 through 290, and stores the new system TPO in value in system TPO 216.

Partition manager 230 comprises a time manager 240, virtual service processors 250 and virtual keylocks 260. Time manager 240 manages and maintains TPOs and TODs for each of the logical partitions, virtual TODs 246 and virtual TPOs 248, and for the system, system TOD 218 and system TPO 216. Time manager 240 manages the TPOs and TODs to allow each partition to independently set a TOD and TPO without concern regarding whether the partition manager 240 will be available to launch the corresponding logical partition. For example, TPOs for logical partitions may default to a disabled state and TODs may default to the TOD associated with server 200. When a client in a different time zone than server 200 accesses logical partition 270, the client requests modification of the TOD of logical partition in virtual TODs 246 to match the client's time zone. The request to change the TOD is received by time manager 240. In response, time manager 240 modifies virtual TODs 246 to reflect the requested change and communicates the modification to system VSP 252 of VSP's 250.

After modifying the TOD for logical partition 270, the client may enable the TPO by requesting that the TPO be set to a time. Time manager 240 receives the request, modifies the corresponding TPO of virtual TPOs 248, and communicates the modifications to system VSP 252 of VSP's 250. System VSP 252 then sets a timer for logical partition 270 in system TPO 216. Upon expiration of the timer, partition manager 230 verifies that the keylock for logical partition 270 is set to "normal", or automatic, and launches logical partition 270.

VSP's 250 service processing requests from logical partitions 270, 280, through 290. VSP's 250 includes system VSP 252. System VSP 252 comprises system TPO determination 253 to determine a time period for setting system TPO 216. System TPO determination 253 is circuitry like a state machine or a processor executing instructions such as software or firmware, to determine the time period based upon a difference between a TPO for a logical partition and the logical partition's current TOD. System TPO determination 253 determines system TPO 216 the smallest time period of the logical partitions having enabled TPOs and sets system TPO 216 based upon the smallest time period. In some embodiments, system TPO 216 is set to boot partition manager 230 at a point in time before the expiration of the smallest time period.

System TPO determination 253 recalculates system TPO 216 in response to an indication from time manager 240 that a TPO or TOD has been modified. Upon determining a new system TPO, system VSP 252 sets system TPO 216 to boot partition manager 230.

Partitioning Licensed Internal Code (PLIC) 259 allocates processing capacity to logical partitions 270 through 290 based upon a system operator's selections with regards to logically partitioning processors 222. For example, processing capacity of processors 222 may be divided dynamically among logical partitions 270 through 290 according to time slices in response to the system operators selections for the logical partitions.

Virtual keylocks 260 include partition overrides for automatically launching logical partitions like logical partitions 270 through 290. Virtual keylocks 260 operate in a similar manner as system keylock 221, allowing each client associated with a logical partition to override the automatic launching of the client's logical partition. For example, during a holiday, when employees are not using logical partition 270, the client associated with logical partition 270 may set a corresponding virtual keylock of virtual keylocks 260 to override automatic launching of logical partition 270, decoupling logical partition 270 from the Internet for the holiday. Thus, the client can avoid unnecessary security risks involved with operating logical partition 270 during the holiday.

Logical partitions 270 through 290 act like multiple servers although each has resources defined by a system operator of server 200 and enforced with partition manager 230 rather than being defined physical limitations. Thus, resources of logical partitions can advantageously be modified via software rather than physically changing hardware.

In many embodiments, each logical partition operates independently from the other logical partitions. For example, one instance of the Advanced Interactive Executive (AIX) operating system, OS 272, may be executing within logical partition 270, a second instance (image) of the AIX operating system, OS 282, may be executing within logical partition 280, and an OS/400 operating system, OS 292, may be operating within logical partition 290.

OS 272 through 292 comprise time consoles 274 through 294 respectively. Time consoles 274 through 294 provide an interface between the client associated with the corresponding logical partition and time manager 240 to allow the clients to modify the TODs and TPOs for each logical system.

In some embodiments, partition manager 230 interfaces with a hardware management console (HMC) that includes a partition manager interface. The partition manager interface provides a system operator or administrator access to functions of partition manager 230 such as creating, modifying, and/or deleting logical partitions, and modifying system TOD 218 and/or system TPO 216. For example, a system administrator accesses server 200 from a remote location to update system TOD 218. The partition manager interface offers the option of modifying system TOD 218 and forwards the request to time manager 240. Upon receipt of the request, time manager 240 communicates the modification to system VSP 250 and system VSP 250 proceeds to recalculate system TPO 216 based upon the change to system TOD 218.

FIG. 3 depicts an example flow chart 300 of a method for launching logical partitions of a computer system. The computer system may have any number of logical partitions including the case of having just one partition. These logical partitions may or may not coincide with physical partitions of the system. Furthermore, the logical partitions may have been assigned fractional computing power of the processor(s), including fractional usage of other resources of the system and may be physically located anywhere in the world, and thus in any time zone.

Flow chart 300 begins with element 310 of storing the TODs and the corresponding time(s) for launching the partition(s) or TPOs for determining a time period, or time count, to launch the system. The logical partition operators or clients generally enter their own TODs and TPOs into the system. These TODs and TPOs are then available to the server for determining which partition needs to be launched next.

In element 315, the server determines the next scheduled time to launch a logical partition, and sets up a timer for the system such that the system is booted prior in time to launch the logical partition. In some embodiments, the logical partition is launched after the system is booted. In other embodiments, a second timer is set for the corresponding logical partition to demark the time to launch that logical partition. For example, the first logical partition is the earliest logical partition scheduled to launch and the second logical partition is scheduled to launch after the first partition. The first logical partition may be associated with the system launch and launched immediately after the system launch or may have a separate timer configured to launch the first logical partition at some point after the system is launched.

Determining the time for launching the system is based upon differences between the time to launch each logical partition and the corresponding current time of day for each logical partitions. In one aspect the time to launch the system may be determined by the following equation:

$$\text{System } TPO = \text{System } TOD + \text{MIN}(TPO_1 - TOD_{TO}, TPO_2 - TOP_2 \ldots TPO_i - TOD_i, \ldots, TPO_n - TOD_n).$$

wherein the subscript i=1, 2, ..., n designates the $i_{th}$ partition of partitions that have enabled, unexpired TPO values; the system TPO is TPO of the system, or the partition manager; and the system TOD is the TOD associated with the server.

For example, the system may have three logical partitions having enabled TPOs: a partition one, partition two, and partition three. The client corresponding to partition one may reside in California and may set partition one's TPO, $TPO_1$, to 8:00 a.m. pacific standard time (PST). The client corresponding to partition two may reside in Texas and may set partition two's TPO, $TPO_2$, to 8:00 a.m. central standard time (CST). And the client corresponding to partition three may reside in New York and may set partition three's TPO, $TPO_3$, to 8:00 a.m. eastern standard time (EST). The system may reside in Texas and the current system TOD may be 5:00 p.m. CST. VSP may determine that the difference between the current $TOD_1$ and $TPO_1$ is 17 hours, between the current $TOD_2$ and $TPO_2$ is 15 hours, and between the current $TOD_3$ and $TPO_3$ is 14 hours. Since 14 hours is the smallest time period, VSP may set the system TPO to power on and launch the system in 13 hours so that the system is operating when $TPO_3$ expires. Then, the system will launch partition two when $TPO_2$ expires, or matches $TOD_2$, and partition one when $TPO_1$ expires, or matches $TOD_1$.

Further, when all partition TPO values are either expired or disabled, the system TPO is disabled. Alternatively, any suitable function may be used that determines when the system should boot to facilitate the time of launch of the logical partitions, taking into account differences in time zones, if applicable.

Element 320, in many embodiments, determines whether an interrupt or a transaction was received to indicate that a logical partition's TPO was disabled. In some embodiments, the partition's TPO may be in one of three possible states. First, the TPO can have a binary value of zero, in which case the TPO is considered disabled. Second, the TPO can have a value such that the TPO is greater than zero but less than or equal the TOD associated with the logical partition. In that case the TPO is considered enabled but expired. Third, in the case of TOD less than TPO, the TPO is considered enabled but not yet expired. In many embodiments, the determination of the system TPO considers enabled TPOs. In further embodiments, the determination of the system TPO considers enabled TPOs that have not expired.

In element 320, determining the time count for the system TPO 315 is performed whenever a partition disables its TPO since the change may affect the resulting system TPO. More specifically, disabled TPO values are ignored when determining the system TPO. Likewise, in element 325, determining the system TPO is performed whenever any partition enables a new TPO.

In element 330, determining the time count for the system TPO 315 is performed whenever a partition changes its TOD and/or its TPO. Since the TPO and TOD are persistently maintained by the time manager within the partition manager there will be a new event sent to the VSP in the partition manager whenever a client changes a logical partition's TOD and/or TPO, or disables TPO. The VSP also recalculates the system TPO and sets a timer associated with the service processor.

In element 335, the partition manager checks to determine whether the changed TPO or TOD resulted in an expired TPO for that logical partition. If the TPO is expired as a result of changing the TOD for the partition, the partition manager generates an error message, in element 340 indicating that the partition has already been launched. Otherwise, the partition manager waits to receive an indication for another change related to a TOD and/or TPO, and/or the expiration of a timer associated with launching a logical partition.

Similarly, in element 345, the partition manager may receive an indication that the system TOD has changed. In such situations, the time manager recalculates the system TPO in element 315. When the TODs for each partition is independently maintained, the time manager also recalculates each partition TOD such that no net time TOD/TPO change is apparent from a partition perspective. The partition TOD/TPO is the same before and after the system TOD/TPO change is made. Alternatively, in element 350, if the time count has expired, the system or the corresponding logical partition should be launched.

Element 355 corresponds to implementing the keylock rules for the system and logical partitions. In element 355, if the keylock is set to normal when a TPO expires, then the partition manager will boot or the corresponding logical partition will launch automatically (element 365). On the other hand, when the keylock is set to manual, no automatic launching of the partition occurs and the partition manager waits for the next change related to a TOD and/or TPO, and/or the expiration of a time count.

One embodiment of the invention is implemented as a program product for use with a computer system such as, for example, the system 100 shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

While the foregoing is directed to embodiments of the present invention, other and further embodiments of the invention may be devised without departing from the basic scope thereof, and the scope thereof is determined by the claims that follow.

What is claimed is:

1. A method for scheduling a launch of one or more logical partitions of a system, the method comprising:
   determining a time period based upon a scheduled time to launch a logical partition of the system and a time of day associated with the logical partition, the logical partition being the next logical partition to launch on the system;
   scheduling a launch for the system based upon the determined time period; and
   launching the system in response to the scheduled launch for the system;
      wherein the scheduled time to launch the logical partition is after the scheduled launch for the system.

2. The method of claim 1, further comprising receiving an indication that the time of day associated with the logical partition was modified and calculating a new time period for the partition.

3. The method of claim 1, further comprising receiving an indication that the time to launch the logical partition was modified.

4. The method of claim 3, wherein receiving the indication comprises receiving a value indicating a new time to launch the logical partition.

5. The method of claim 1, further comprising changing the scheduled launch for the system when a subsequent time period is determined to be shorter than the time period, wherein the scheduled launch for the system is a system timed power-on.

6. The method of claim 1, further comprising launching the logical partition unless the scheduled time to launch for the logical partition is overridden.

7. The method of claim 1, wherein determining the time period comprises calculating the difference between a timed power-on associated with the logical partition and the time of day associated with the partition.

8. The method of claim 7, wherein scheduling the launch for the system comprises setting a timer based upon an enabled timed power-on.

9. The method of claim 1, wherein launching the system comprises powering on hardware of the system and booting partition management code.

10. An apparatus for scheduling a launch of one or more logical partitions of a system having a plurality of logical partitions, the apparatus comprising:
   system hardware partitioned into the plurality of logical partitions, each logical partition having a scheduled partition timed power on (TPO);
   partition management circuitry; and
   a timer coupled with the system hardware to boot the partition management circuitry based upon a system TPO, the system TPO being a scheduled time for powering on the system and being based on the respective scheduled partition TPOs;
   wherein the partition management circuitry:
      receives an event to indicate modification of a time to launch a logical partition of the plurality of logical partions;
      determines whether the system TPO requires rescheduling in response to the event; and
      upon determining that the system TPO requires rescheduling, performs the rescheduling.

11. The apparatus of claim 10, further comprising a client coupled with the logical partition to generate the event.

12. The apparatus of claim 10, wherein the system hardware comprises at least one processor coupled with memory.

13. The apparatus of claim 10, wherein the partition management circuitry comprises allocation circuitry to allocate processing capacity to the at least one logical partition.

14. The apparatus of claim 13, wherein the allocation circuitry allocates a fraction of the processing capacity of a processor to the logical partition.

15. The apparatus of claim 13, wherein the allocation circuitry comprises circuitry to determine a respective time period for launching each logical partition based upon a difference between the respective partition TPO and a time of day for the respective logical partition.

16. The apparatus of claim 15 wherein the partition management circuitry comprises time management circuitry to maintain the respective partition TPO and time of day for each logical partition.

17. The apparatus of claim 15, wherein partition management circuitry comprises time management circuitry to initiate a transaction to indicate a change related to the respective time periods.

18. The apparatus of claim 10, wherein the timer comprises a service processor to boot the system when a time of day associated with the system reaches the system TPO.

19. A computer readable storage medium containing a program which, when executed, performs an operation, comprising:
   determining a time period based upon a scheduled time to launch a logical partition of a system and a time of day associated with the logical partition, the logical partition being the next logical partition to launch on the system;
   scheduling a launch for the system based upon the determined time period; and
   launching the system in response to the scheduled launch for the system;
      wherein the scheduled time to launch the logical partition is after the scheduled launch for the system.

20. The computer readable storage medium of claim 19, wherein the operation further comprises receiving an indication that the time of day associated with the logical partition was modified and calculating a new time period for the partition.

21. The computer readable medium storage of claim 19, wherein the operation further comprises receiving an indication that the time to launch the logical partition was modified.

22. The computer readable storage medium of claim 19, wherein the operation further comprises changing the scheduled launch for the system when a subsequent time period is determined to be shorter than the time period.

23. The computer readable storage medium of claim 19, wherein the operation further comprises scheduling a launch for the logical partition based upon the time period, wherein the scheduled launch for the logical partition is after the scheduled launch for the system.

24. The computer readable storage medium of claim 19, wherein determining the time period comprises calculating the difference between a timed power-on associated with the partition and the time of day.

* * * * *